United States Patent
Abotabl et al.

(10) Patent No.: US 12,348,306 B2
(45) Date of Patent: Jul. 1, 2025

(54) UPLINK CONFIGURED GRANT OR SEMI-PERSISTENT SCHEDULING CONFIGURATION WITH MULTIPLE MODULATION AND CODING SCHEME VALUES TO ACCOMMODATE LOW UPLINK BUFFER DATA

(71) Applicant: QUALCOMM Incorporated, San Diego, CA (US)

(72) Inventors: Ahmed Attia Abotabl, San Diego, CA (US); Yi Huang, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/821,365

(22) Filed: Aug. 22, 2022

(65) Prior Publication Data
US 2024/0063937 A1    Feb. 22, 2024

(51) Int. Cl.
*H04L 1/00* (2006.01)
(52) U.S. Cl.
CPC .................................. *H04L 1/0003* (2013.01)
(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | | |
|---|---|---|---|
| 2018/0167161 A1* | 6/2018 | Davydov | H04L 1/0001 |
| 2019/0288788 A1* | 9/2019 | Bengtsson | H04L 1/0018 |
| 2021/0126733 A1* | 4/2021 | Chen | H04L 1/0011 |
| 2022/0046597 A1* | 2/2022 | Awad | H04W 72/02 |
| 2023/0239898 A1* | 7/2023 | Li | H04W 72/232 370/329 |

* cited by examiner

*Primary Examiner* — Bo Hui A Zhu
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, an uplink configured grant or semi-persistent scheduling (UL-CG/SPS) configuration. The UE may select, among multiple modulation and coding scheme (MCS) values associated with the UL-CG/SPS configuration, an MCS value to use in a current transmission occasion associated with the UL-CG/SPS configuration based at least in part on an amount of data stored in an uplink buffer. The UE may transmit, in the current transmission occasion associated with the UL-CG/SPS configuration, a transport block using the selected MCS value. Numerous other aspects are described.

28 Claims, 7 Drawing Sheets

UPLINK CONFIGURED GRANT OR SEMI-PERSISTENT SCHEDULING CONFIGURATION WITH MULTIPLE MODULATION AND CODING SCHEME VALUES TO ACCOMMODATE LOW UPLINK BUFFER DATA

FIELD OF THE DISCLOSURE

Aspects of the present disclosure generally relate to wireless communication and to techniques and apparatuses associated with an uplink configured grant or semi-persistent scheduling (UL-CG/SPS) configuration with multiple modulation and coding scheme (MCS) values to accommodate low uplink buffer data.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, an uplink configured grant or semi-persistent scheduling (UL-CG/SPS) configuration. The method may include selecting, among multiple modulation and coding scheme (MCS) values associated with the UL-CG/SPS configuration, an MCS value to use in a current transmission occasion associated with the UL-CG/SPS configuration based at least in part on an amount of data stored in an uplink buffer. The method may include transmitting, in the current transmission occasion associated with the UL-CG/SPS configuration, a transport block using the selected MCS value.

Some aspects described herein relate to a UE for wireless communication. The UE may include a memory and one or more processors coupled to the memory. The one or more processors may be configured to receive, from a network node, a UL-CG/SPS configuration. The one or more processors may be configured to select, among multiple MCS values associated with the UL-CG/SPS configuration, an MCS value to use in a current transmission occasion associated with the UL-CG/SPS configuration based at least in part on an amount of data stored in an uplink buffer. The one or more processors may be configured to transmit, in the current transmission occasion associated with the UL-CG/SPS configuration, a transport block using the selected MCS value.

Some aspects described herein relate to a non-transitory computer-readable medium that stores a set of instructions for wireless communication by a UE. The set of instructions, when executed by one or more processors of the UE, may cause the UE to receive, from a network node, a UL-CG/SPS configuration. The set of instructions, when executed by one or more processors of the UE, may cause the UE to select, among multiple MCS values associated with the UL-CG/SPS configuration, an MCS value to use in a current transmission occasion associated with the UL-CG/SPS configuration based at least in part on an amount of data stored in an uplink buffer. The set of instructions, when executed by one or more processors of the UE, may cause the UE to transmit, in the current transmission occasion associated with the UL-CG/SPS configuration, a transport block using the selected MCS value.

Some aspects described herein relate to an apparatus for wireless communication. The apparatus may include means for receiving, from a network node, a UL-CG/SPS configuration. The apparatus may include means for selecting, among multiple MCS values associated with the UL-CG/SPS configuration, an MCS value to use in a current transmission occasion associated with the UL-CG/SPS configuration based at least in part on an amount of data stored in an uplink buffer. The apparatus may include means for transmitting, in the current transmission occasion associated with the UL-CG/SPS configuration, a transport block using the selected MCS value.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
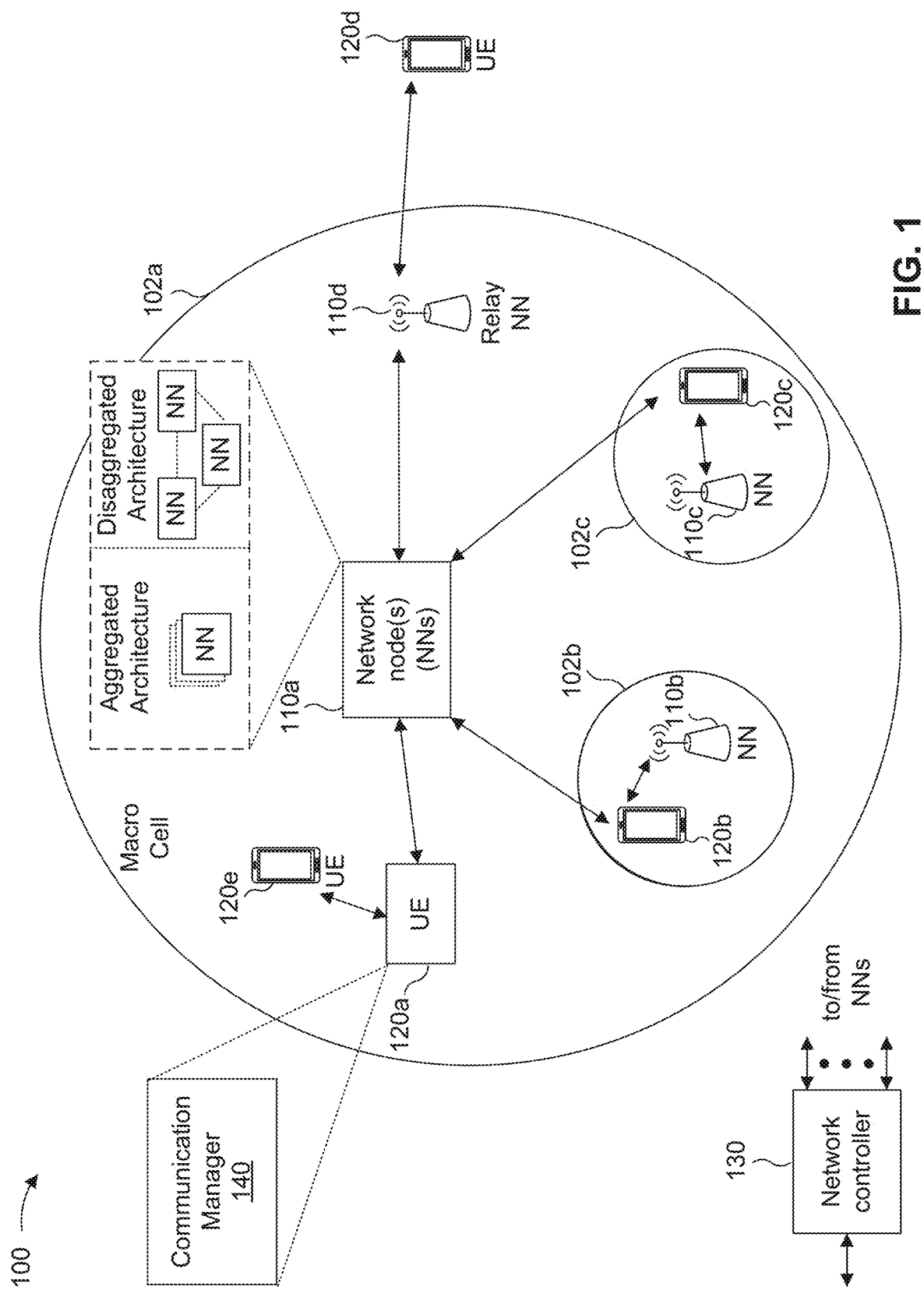
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, an uplink configured grant or semi-persistent scheduling (UL-CG/SPS) configuration; select, among multiple modulation and coding scheme (MCS) values associated with the UL-CG/SPS configuration, an MCS value to use in a current transmission occasion associated with the UL-CG/SPS configuration based at least in part on an amount of data stored in an uplink buffer; and transmit, in the current transmission occasion associated with the UL-CG/SPS configuration, a transport block using the selected MCS value. Additionally, or alternatively, the communication manager 140 may perform one or more other operations described herein.

As indicated above, FIG. 1 is provided as an example. Other examples may differ from what is described with regard to FIG. 1.

Figure 2:
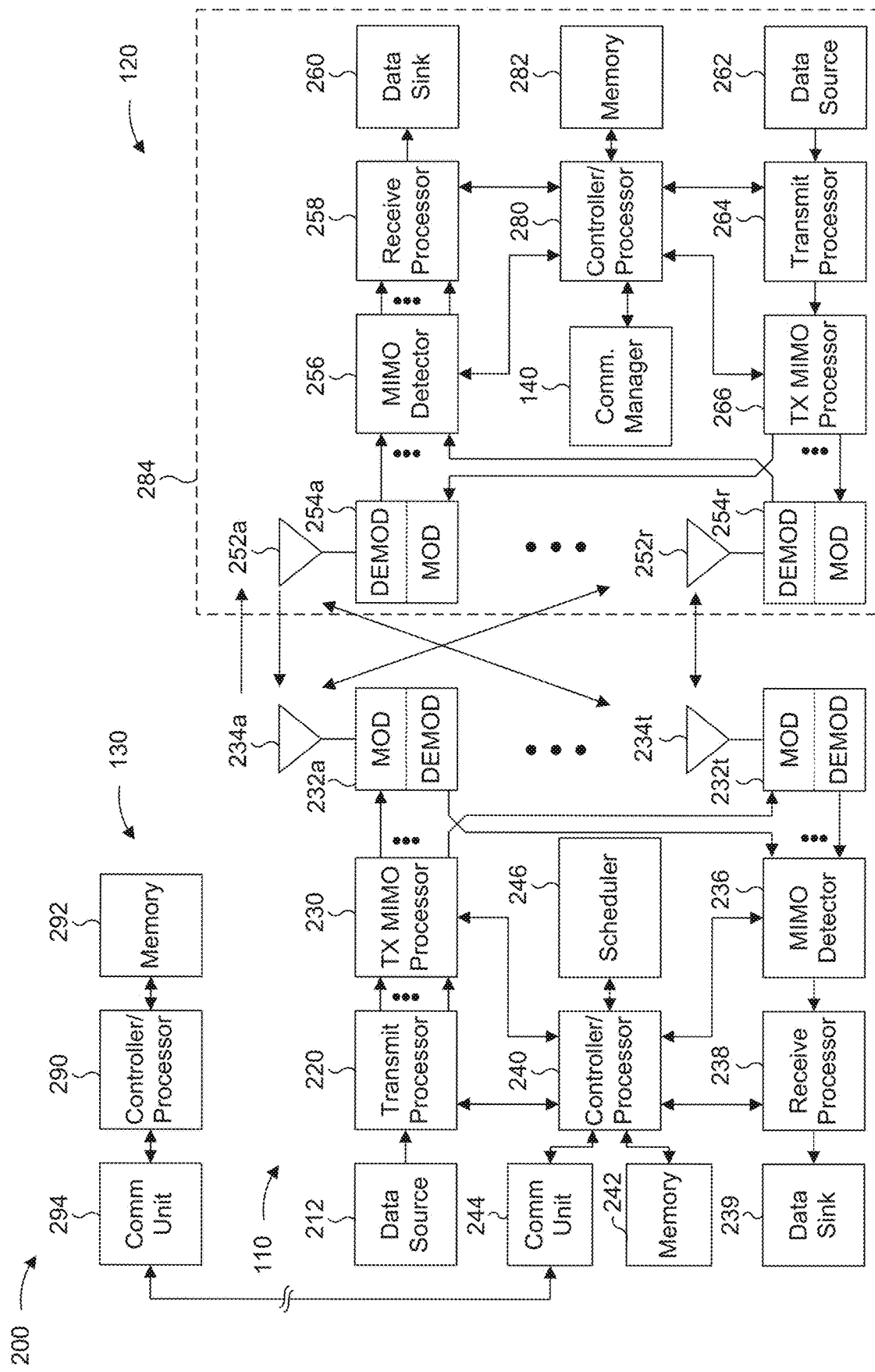
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the network node 110, the controller/processor 280 of the UE 120, and/or any other component(s) of FIG. 2 may perform one or more techniques associated with a UL-CG/SPS configuration with multiple MCS values to accommodate low uplink buffer data, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE 120 includes means for receiving, from a network node 110, a UL-CG/SPS configuration; means for selecting, among multiple MCS values associated with the UL-CG/SPS configuration, an MCS value to use in a current transmission occasion associated with the UL-CG/SPS configuration based at least in part on an amount of data stored in an uplink buffer; and/or means for transmitting, in the current transmission occasion associated with the UL-CG/SPS configuration, a transport block using the selected MCS value. The means for the UE 120 to perform operations described herein may include, for example, communication manager 140, antenna 252, modem 254, MIMO detector 256, receive processor 258, transmit processor 264, TX MIMO processor 266, controller/processor 280, and/or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
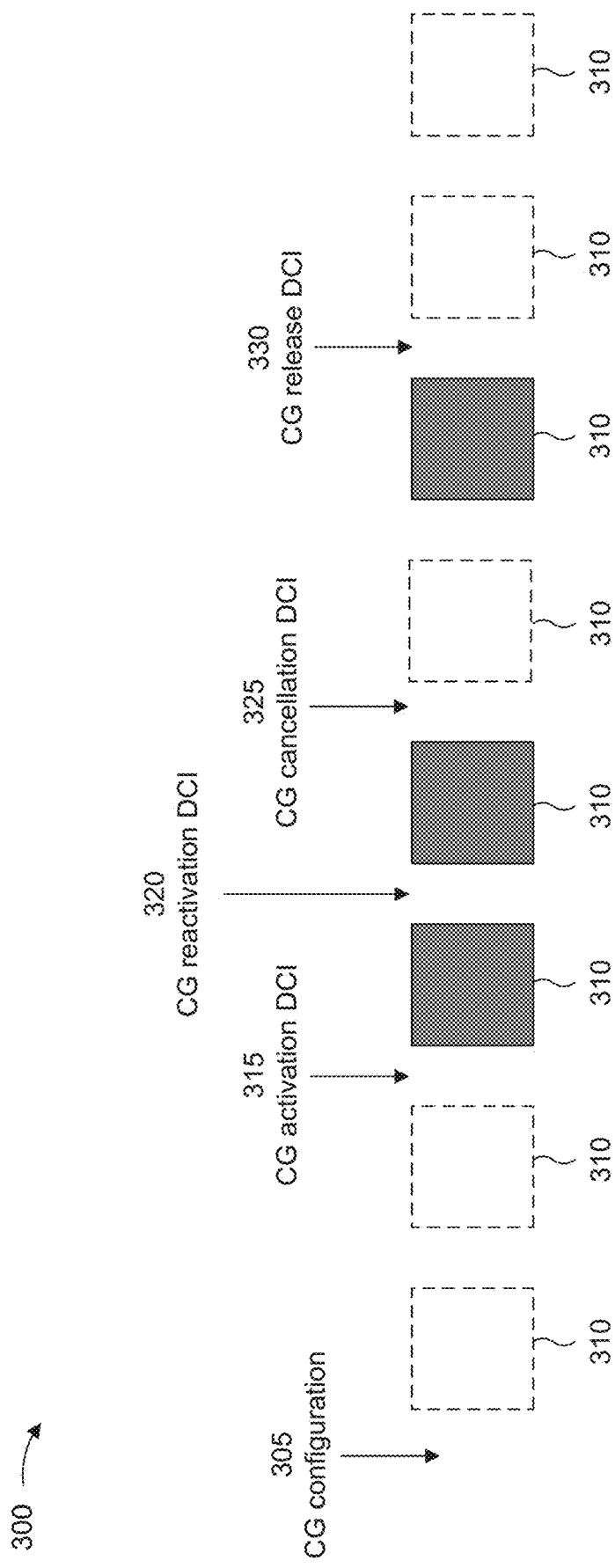
FIGS. 3-4 are diagrams illustrating examples of uplink configured grant (CG) communication, in accordance with the present disclosure.

FIG. 3 is a diagram illustrating an example 300 of uplink configured grant (CG) communication, in accordance with the present disclosure. As described herein, CG communications may include periodic uplink communications that are configured for a UE, such that a network node does not need to send separate downlink control information (DCI) to schedule each uplink communication, thereby conserving signaling overhead and/or reducing uplink latency. Furthermore, although various aspects and/or examples are described herein in relation to an uplink CG configuration, it will be appreciated that the aspects and/or examples described herein may be similarly applicable to an uplink semi-persistent scheduling (SPS) configuration. In particular, uplink CG configurations (e.g., in NR networks) and uplink SPS configurations (e.g., in LTE networks) each generally configure periodic uplink transmission occasions for a UE such that the UE can perform an uplink transmission (e.g., a physical uplink shared channel (PUSCH) transmission) in an uplink transmission occasion without an uplink grant. Accordingly, any aspects or examples described herein that relate to an uplink CG configuration may be applicable to an uplink SPS configuration (and vice versa), and any aspects or examples described herein that relate to an uplink CG or SPS (UL-CG/SPS) configuration may be applicable to an uplink CG configuration, an uplink SPS configuration, or both.

As shown by reference number 305, a UE may be configured with a CG configuration for grant-free uplink communications. For example, the UE may receive the CG configuration via a radio resource control (RRC) message transmitted by a network node. The CG configuration may indicate a resource allocation associated with CG uplink communications (e.g., in a time domain, a frequency domain, a spatial domain, and/or a code domain) and a periodicity at which the resource allocation is repeated, resulting in periodically reoccurring scheduled CG occasions 310 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

As shown by reference number 315, the network node may transmit CG activation DCI to the UE to activate the CG configuration for the UE. The network node may indicate, in the CG activation DCI, communication parameters such as an MCS, a resource block (RB) allocation, antenna ports, and/or other suitable parameters for CG physical uplink shared channel (PUSCH) communications to be transmitted in the scheduled CG occasions 310. The UE may begin transmitting in the CG occasions 310 based at least in part on receiving the CG activation DCI. For example, beginning with a next scheduled CG occasion 310 subsequent to receiving the CG activation DCI, the UE may transmit a PUSCH communication in the scheduled CG occasions 310 using the communication parameters indicated in the CG activation DCI. The UE may refrain from transmitting in configured CG occasions 310 prior to receiving the CG activation DCI (e.g., in cases where the CG configuration is a Type 2 configured grant that requires DCI activation). Alternatively, the CG configuration may be a Type 1 configured grant that does not require DCI activation, in which case the UE may transmit in configured CG occasions 310 without receiving any CG activation DCI.

As shown by reference number 320, the network node may transmit CG reactivation DCI to the UE to change one or more communication parameters for the CG PUSCH communications. Based at least in part on receiving the CG reactivation DCI, the UE may begin transmitting in the scheduled CG occasions 310 using the updated communication parameter(s) indicated in the CG reactivation DCI. For example, beginning with a next scheduled CG occasion 310 subsequent to receiving the CG reactivation DCI, the UE may transmit PUSCH communications in the scheduled CG occasions 310 based at least in part on the updated communication parameter(s) indicated in the CG reactivation DCI.

In some cases, as shown by reference number 325, the network node may transmit CG cancellation DCI to the UE to temporarily cancel or deactivate one or more subsequent CG occasions 310 for the UE. For example, the network node may transmit the CG cancellation DCI to temporarily cancel or deactivate one or more subsequent CG occasions 310 when the network node needs to override a scheduled CG communication for a higher priority communication. The CG cancellation DCI may deactivate only one subsequent CG occasion 310 or may deactivate N subsequent CG occasions 310 (where N is a positive integer). CG occasions 310 after the one or more (e.g., N) CG occasions 310 subsequent to the CG cancellation DCI may remain activated. Based at least in part on receiving the CG cancellation DCI, the UE may refrain from transmitting in the one or more (e.g., N) CG occasions 310 subsequent to receiving the CG cancellation DCI. As shown in example 300, the CG cancellation DCI cancels one subsequent CG occasion 310 for the UE. After the CG occasion 310 (or N CG occasions) subsequent to receiving the CG cancellation DCI, the UE may automatically resume transmission in the scheduled CG occasions 310.

As shown by reference number 330, the network node may transmit CG release DCI to the UE to deactivate the CG configuration for the UE. The UE may stop transmitting in the scheduled CG occasions 310 based at least in part on receiving the CG release DCI. For example, the UE may refrain from transmitting in any scheduled CG occasions 310 until another CG activation DCI is received from the network node. Whereas the CG cancellation DCI may deactivate only one subsequent CG occasion 310 or N subsequent CG occasions 310, the CG release DCI deactivates all subsequent CG occasions 310 for a given CG configuration for the UE until the given CG configuration is activated again by a new CG activation DCI.

As indicated above, FIG. 3 is provided as an example. Other examples may differ from what is described with regard to FIG. 3.

Figure 4:
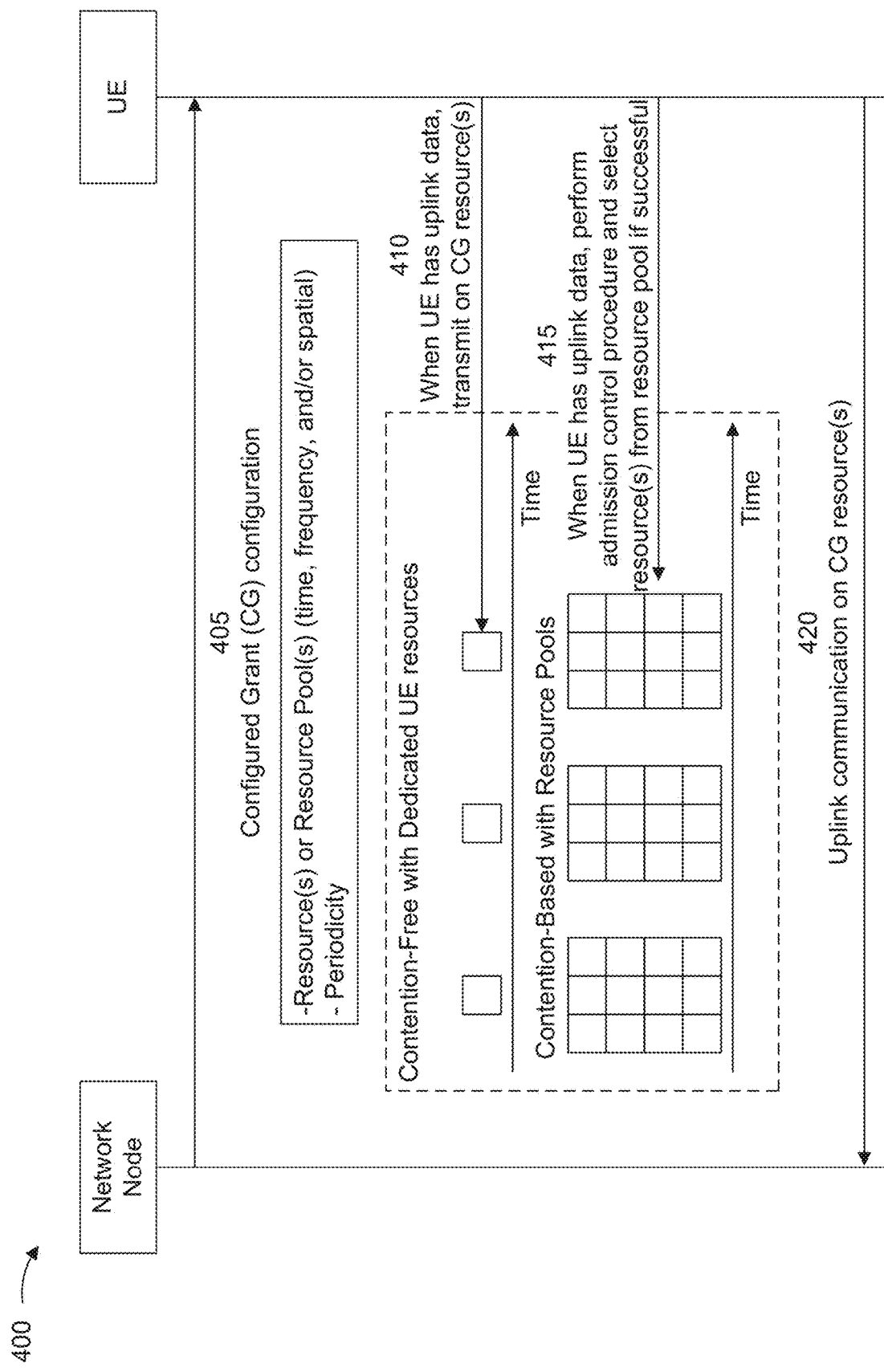

FIG. 4 is a diagram illustrating an example 400 of uplink CG communication, in accordance with the present disclosure. As shown in FIG. 4, example 400 includes communication between a network node and a UE. In some aspects, the network node and the UE may communicate in a wireless network, such as wireless network 100. The network node and the UE may communicate via a wireless access link, which may include an uplink and a downlink.

As shown in FIG. 4, and by reference number 405, the network node may transmit a CG configuration to the UE. For example, the network node may transmit configuration information (e.g., in an RRC message, in a DCI message, and/or in another signaling message) that identifies the CG. In some aspects, the configuration information identifying the CG may indicate a resource allocation (e.g., in a time domain, a frequency domain, a spatial domain, and/or a code domain), a periodicity associated with the resource allocation, a repetition pattern, and/or other suitable parameters. The CG may identify a resource or a set of resources available to the UE for transmission of an uplink communication (e.g., data and/or control information). For example, the CG configuration may identify a resource allocation for a PUSCH transmission by the UE. In some aspects, the CG configuration may identify a resource pool or multiple resource pools that may be available to the UE for an uplink transmission that carries a transport block.

In some aspects, the CG configuration may configure contention-free CG communication with resources dedicated for the UE to transmit uplink communications. In this case, the CG configuration may indicate a resource allocation (e.g., in a time domain, a frequency domain, a spatial domain, and/or a code domain) dedicated for the UE to use to transmit uplink communications. In some aspects, the CG configuration may configure the resource allocation for the UE to occur periodically, such that the resource allocation corresponds to periodically occurring transmission occasions. As shown in FIG. 4, and by reference number 410, when the UE has uplink data to transmit (e.g., uplink data to be transmitted by the UE is stored in an uplink buffer), the UE transmits the uplink data in the CG resources identified by the CG configuration. For example, the UE transmits the uplink data in one of the CG uplink occasions identified in the CG configuration using the configured resource allocation.

A CG configuration with regular periodic CG uplink transmission occasions with a dedicated resource allocation for the UE may be convenient for a UE with periodic uplink traffic (e.g., with trivial jitter) and/or a low latency requirement. The CG configuration may configure the periodicity associated with the resource allocation to associate CG uplink occasions with periodic nominal arrival times at which traffic to be transmitted to the network node is expected to arrive at (or be ready to be transmitted by) the UE. However, the actual arrival times at which the traffic arrives at (or is ready to be transmitted by) the UE may be different than the nominal arrival times, and this difference in times is known as jitter. In some aspects, traffic jittering may be handled by configuring multiple CGs around the nominal arrival times. In some aspects, multiple opportunities for the UE to transmit the uplink communication may be defined within a CG uplink occasion. The UE may be configured with multiple CG uplinks to allow the UE to repeatedly transmit the CG uplink communications and increase the likelihood that the network node receives the communications. NR CG uplink may depend on dynamic grant retransmission. In some aspects, to suppress a quantity of dynamic grants, the CG can be configured with blind retransmissions via multiple repetitions per occasion.

In some cases, CG configurations with dedicated resources allocated per UE may be inefficient. For example, CG configurations with dedicated UE resources for a large number of UEs may result in consumption of an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a packet may have been already decoded after the first one or more repetitions (early decoding) such that a remainder of the repetitions are unnecessary. Unlike a downlink case, this type of inefficient consumption of system resources cannot be addressed by scheduling, as the network node does not know exactly when traffic will arrive at the UEs.

In some aspects, statistical multiplexing schemes may be used to allocate CG uplink resource access among multiple UEs. Statistical multiplexing of CG uplink communications from multiple UEs may be useful in cases in which there are a high number of UEs associated with somewhat random traffic arrivals at the network node and/or cases in which a traffic arrival density for traffic arriving at the UEs is time varying. For example, statistical multiplexing of CG uplink communications from multiple UEs may be useful for a network deployment, such as an industrial wireless sensor network, with a large capacity of UEs. In such cases, the uplink traffic associated with at least a group of UEs may be delay insensitive.

As shown in FIG. 4, the CG configuration may configure contention-based CG communication with resource pools that are available for multiple UEs to use to transmit uplink communications. The contention-based CG configuration uses statistical multiplexing to share the resource pools among multiple UEs. A resource pool includes multiple resources (e.g., in a time domain, frequency domain, spatial domain, and/or code domain) that can be allocated for uplink transmission for one or more UEs. For example, an x-axis of an illustrated resource pool may indicate transmission times and a y-axis of the illustrated resource pool may indicate resources (e.g., frequency domain, spatial domain, and/or code domain) that can be allocated at each transmission time. In some aspects, the same resource pools may be configured for multiple UEs.

As further shown in FIG. 4, and by reference number 415, for the contention-based CG configuration, when the UE has uplink data to be transmitted, the UE performs an admission control procedure and selects one or more resources from the resource pool if the admission control procedure is successful. In some aspects, the admission control procedure may include the UE selecting a random number (e.g., between 0 and 1 or some other range) and determining whether the random number satisfies a threshold. If the random number satisfies the threshold, then the admission is successful and the UE selects a resource from the resource pool to transmit the uplink communication.

In some aspects, the network node may control the probability of the UE accessing the resource pool by setting and/or adjusting the threshold. For example, the network node may dynamically adjust the threshold to permit more or fewer UEs to access the resource pool in order to prevent resource collisions. Additionally, or alternatively, the network node may assign different thresholds to be used by different UEs.

Based at least in part on the UE determining that the random number satisfies the threshold, the UE may select a resource from the resource pool to transmit the uplink communication. The UE may select the resource from the resource pool using randomized and/or pseudo-randomized resource selection. For example, the UE may use a hashing function based at least in part on a UE identifier, time, and/or resource pool index to select the resource from the resource pool.

As further shown in FIG. 4, and by reference number 420, the UE transmits the uplink communication to the network node on the CG resource. For example, the UE may transmit the uplink communication as a PUSCH communication using a resource allocation identified by the CG.

In general, when a UL-CG/SPS configuration is configured and/or activated for a UE, the network node may indicate a specific MCS value that the UE is to use when transmitting a PUSCH communication that carries a transport block within a transmission occasion associated with the UL-CG/SPS, where the amount of data that can be transmitted in a UL-CG/SPS transmission occasion (e.g., a transport block size) may depend on the MCS value and the available time and frequency resources. Furthermore, as described herein, whether the UE transmits a PUSCH communication in a particular transmission occasion may depend on whether an uplink buffer has uplink data to transmit. For example, in cases where the uplink buffer of the UE does not have enough data to transmit in a UL-CG/SPS transmission occasion (e.g., the uplink buffer is empty or the amount of uplink data stored in the uplink buffer is significantly less than the transport block size associated with the configured MCS value), the UE can perform uplink skipping by refraining from transmitting a PUSCH communication in a current UL-CG/SPS transmission occasion and waiting until a next UL-CG/SPS transmission occasion to transmit the PUSCH communication. However, when the uplink buffer is short on uplink data (e.g., there is a small number of bits to be transmitted), the UE has to keep the uplink buffer busy (which consumes more power) and the UE has to wait for more uplink data to transmit (which increases latency). Alternatively, the UE may pad the PUSCH communication with zeros to fill the transport block size and transmit the PUSCH communication using the configured MCS value. In this case, however, the UE is transmitting the PUSCH communication with a higher MCS value than is necessary, which results in increased overhead (e.g., due to the larger transport block size) and reduced reliability (e.g., because lower MCS values are generally associated with lower error rates).

Figure 5:
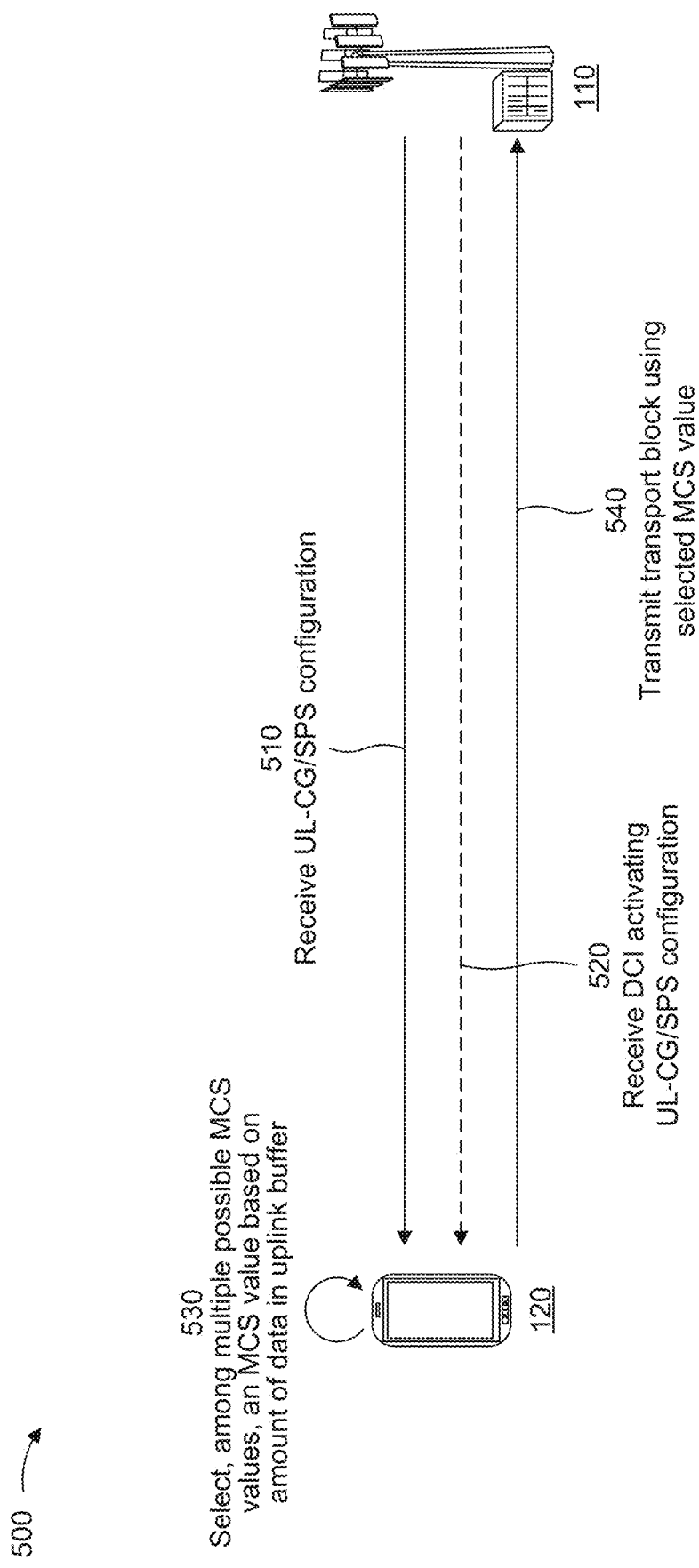
FIG. 5 is a diagram illustrating an example associated with an uplink configured grant or semi-persistent scheduling (UL-CG/SPS) configuration with multiple modulation and coding scheme (MCS) values to accommodate low uplink buffer data, in accordance with the present disclosure.

Accordingly, as described in further detail herein with reference to FIG. 5, some aspects relate to techniques to configure and/or activate a UL-CG/SPS with multiple candidate MCS values to accommodate cases where the uplink buffer of the UE has a small amount of data to transmit (e.g., the amount of data in the uplink buffer is less than the transport block size associated with the UL-CG/SPS configuration), which may be especially useful for applications with regular traffic patterns and strict latency and/or reliability requirements (e.g., extended reality (XR) applications).

As indicated above, FIG. 4 is provided as an example. Other examples may differ from what is described with regard to FIG. 4.

FIG. 5 is a diagram illustrating an example 500 associated with a UL-CG/SPS configuration with multiple MCS values to accommodate low uplink buffer data, in accordance with the present disclosure. As shown in FIG. 5, example 500 includes communication between a network node 110 and a UE 120. In some aspects, the network node 110 and the UE 120 may communicate in a wireless network, such as wireless network 100. The network node 110 and the UE 120 may communicate via a wireless access link, which may include an uplink and a downlink As shown in FIG. 5, and by reference number 510, the network node 110 may transmit, and the UE 120 may receive, a UL-CG/SPS configuration that supports multiple MCS values. For example, the network node may transmit UL-CG/SPS configuration information in an RRC message and/or another suitable message that indicates one or more communication parameters for the UL-CG/SPS configuration. In some aspects, the UL-CG/SPS configuration information may indicate a resource allocation (e.g., in a time domain, a frequency domain, a spatial domain, and/or a code domain), a periodicity associated with the resource allocation, a repetition pattern, and/or other suitable parameters. As further shown in FIG. 5, and by reference number 520, the network node 110 may optionally transmit, and the UE 120 may receive, DCI that activates the UL-CG/SPS configuration (e.g., in cases where the UL-CG/SPS configuration is a Type 2 CG configuration, an uplink SPS configuration, or another grant-free uplink configuration that requires DCI activation).

In some aspects, as described herein, the UL-CG/SPS configuration provided by the network node 110 may be associated with multiple MCS values such that the UE 120 can autonomously select an appropriate MCS value to use when transmitting a transport block in a UL-CG/SPS transmission occasion based on an amount of uplink data stored in an uplink buffer. For example, as described herein, the UL-CG/SPS configuration may be associated with a high MCS value and a low MCS value, and may optionally be further associated with one or more MCS values between the high MCS value and the low MCS value. Accordingly, in cases where the uplink buffer of the UE 120 contains sufficient uplink data to fill a transport block size associated with the high MCS value, the UE 120 may transmit a transport block in a UL-CG/SPS transmission occasion using the high MCS value. Alternatively, in cases where the uplink buffer of the UE 120 is not empty and does not contain sufficient uplink data to fill the transport block size associated with the high MCS value, the UE 120 may transmit the transport block in a UL-CG/SPS transmission occasion using the low MCS value or one of the intermediate MCS values (if configured) depending on the amount of uplink data.

For example, in some aspects, the multiple MCS values associated with the UL-CG/SPS configuration may be indicated in the signaling that initially configures the UL-CG/SPS (e.g., one or more RRC messages transmitted by the network node 110). In some aspects, the multiple MCS values associated with the UL-CG/SPS configuration may be indicated in the signaling that initially configures the UL-CG/SPS configuration in cases where the UL-CG/SPS configuration is a Type 1 CG configuration or another suitable grant-free uplink configuration that does not require DCI activation. However, it will be appreciated that the multiple MCS values may also be indicated in the signaling that initially configures the UL-CG/SPS configuration in cases where the UL-CG/SPS configuration requires DCI activation. Additionally, or alternatively, in cases where the UL-CG/SPS is a Type 2 CG configuration, an uplink SPS configuration, or another suitable grant-free uplink configuration that requires DCI activation, the multiple MCS values associated with the UL-CG/SPS may be indicated in the activation DCI. For example, in some aspects, the activation DCI may include an MCS field (e.g., a five-bit field), where a value of the MCS field may point to otherwise indicate an entry in an MCS table that includes multiple MCS values. For example, in some aspects, the MCS table may be configured via RRC signaling or may be predefined (e.g., in a wireless communication standard). Additionally, or alternatively, the network node 110 may transmit RRC signaling to configure the UE 120 with one or more MCS offset values that the UE 120 can use to derive the multiple MCS values associated with the UL-CG/SPS configuration. For example, in some aspects, the DCI activating the UL-CG/SPS configuration may include an MCS field that identifies a single MCS value, and the UE 120 may derive one or more additional MCS values from the single MCS value based on the one or more RRC-configured MCS offset values (e.g., if an RRC-configured MCS offset has a value of negative five (−5) and the activation DCI indicates an MCS value of twenty (20), the UE 120 may derive a second MCS value of fifteen (15) based on the MCS value indicated in the activation DCI and the RRC-configured MCS offset value).

Accordingly, as shown by reference number 530, the UE 120 may select, among the multiple possible MCS values that are available to use in a current UL-CG/SPS transmission occasion, an MCS value to be used to transmit a transport block in the current UL-CG/SPS transmission occasion based on the amount of uplink data stored in the uplink buffer of the UE 120. For example, as described herein, the multiple MCS values may include a high MCS value and a low MCS value, and may optionally further include one or more intermediate MCS values between the high MCS value and the low MCS value. In general, a higher MCS value may be associated with a higher transport block size, whereby the UE 120 may transmit a transport block in a current UL-CG/SPS transmission occasion using one of the multiple MCS values associated with the UL-CG/SPS configuration, depending on how much uplink data is stored in the uplink buffer. For example, among a first MCS value and a second MCS value, where the first MCS value is greater than the second MCS value (e.g., the first MCS value is associated with a larger transport block size than the second MCS value), the UE 120 may select the first (higher) MCS value based on the uplink data stored in the uplink buffer satisfying a threshold associated with the first (higher)

MCS value (e.g., the amount of uplink data stored in the uplink buffer is sufficient to fill the transport block size of the higher MCS value). Otherwise, if the uplink data stored in the uplink buffer fails to satisfy the threshold associated with the higher MCS value but is sufficient to satisfy a threshold associated with the lower MCS value (e.g., the amount of uplink data stored in the uplink buffer is sufficient to fill the transport block size of the lower MCS value but insufficient to fill the transport block size of the higher MCS value), the UE 120 may select the lower MCS value. Alternatively, if the uplink data stored in the uplink buffer is insufficient to satisfy a threshold associated with a lowest MCS value among the multiple available MCS values (e.g., the amount of uplink data stored in the uplink buffer cannot fill the smallest available transport block size), the UE 120 may either skip the current UL-CG/SPS transmission occasion or append zeros to the transport block in order to transmit using the smallest MCS value.

As further shown in FIG. 5, and by reference number 540, the UE 120 may transmit the transport block in the current UL-CG/SPS transmission occasion using the MCS value that was selected (e.g., autonomously by the UE 120) among multiple possible MCS values based on the amount of uplink data stored in the uplink buffer. Furthermore, in some aspects, the UE 120 may indicate the selected MCS value used to transmit the transport block in the current UL-CG/SPS transmission occasion. For example, the network node 110 may need to know the MCS value that was used to transmit the transport block in order to properly decode the transport block (e.g., although the network node 110 could perform blind decoding based on each potential MCS value, performing blind decoding would incur significant overhead at the network node 110). For example, in some aspects, the multiple MCS values that are available for the UE 120 to select may each be associated with a different DMRS sequence. In this example, the UE 120 may indicate the MCS value used to transmit the transport block by configuring a PUSCH communication that carries the transport block transmitted by the UE 120 to include a DMRS sequence associated with the selected MCS value, and the network node 110 may determine the selected MCS value by blindly attempting to detect the various DMRS sequences associated with the different MCS values. Additionally, or alternatively, the UE 120 may explicitly indicate the selected MCS value in uplink control information (UCI) associated with the current UL-CG/SPS transmission occasion (e.g., in UCI that is piggybacked onto or multiplexed with the PUSCH communication or associated with another suitable physical uplink control channel (PUCCH) configuration). Additionally, or alternatively, the UE 120 may indicate the MCS value used to transmit the transport block in a UL-CG/SPS transmission occasion immediately prior to the current UL-CG/SPS transmission occasion (e.g., prior to the UL-CG/SPS transmission occasion where the autonomous MCS selection occurs). For example, the UE 120 may be able to determine an uplink transmission pattern that allows the UE 120 to determine how much uplink data is likely to be available at the time of the next UL-CG/SPS transmission occasion, whereby the UE 120 may indicate the MCS value that will be used in the next UL-CG/SPS transmission occasion.

Accordingly, as described herein, the UE 120 may use one or more techniques to indicate the selected MCS value to the network node 110, which may enable the network node 110 to correctly decode the transport block. Furthermore, in some aspects, the indication of the selected MCS value may indicate to the network node 110 the amount of uplink data available for transmission by the UE 120, which can be used by the network node 110 to further enhance scheduling for the UE 120. For example, if the UE 120 skips a UL-CG/SPS transmission occasion, the network node 110 may determine that the UE 120 has a very small amount of uplink data (or no uplink data) to transmit, which the network node 110 may utilize when making subsequent scheduling decisions for the UE 120. Additionally, or alternatively, the MCS value that the UE 120 uses to transmit a transport block may indicate whether the UE 120 has a large amount, a small amount, or an intermediate amount of uplink data to transmit, which may similarly be used to make scheduling decisions for the UE 120.

As indicated above, FIG. 5 is provided as an example. Other examples may differ from what is described with regard to FIG. 5.

Figure 6:
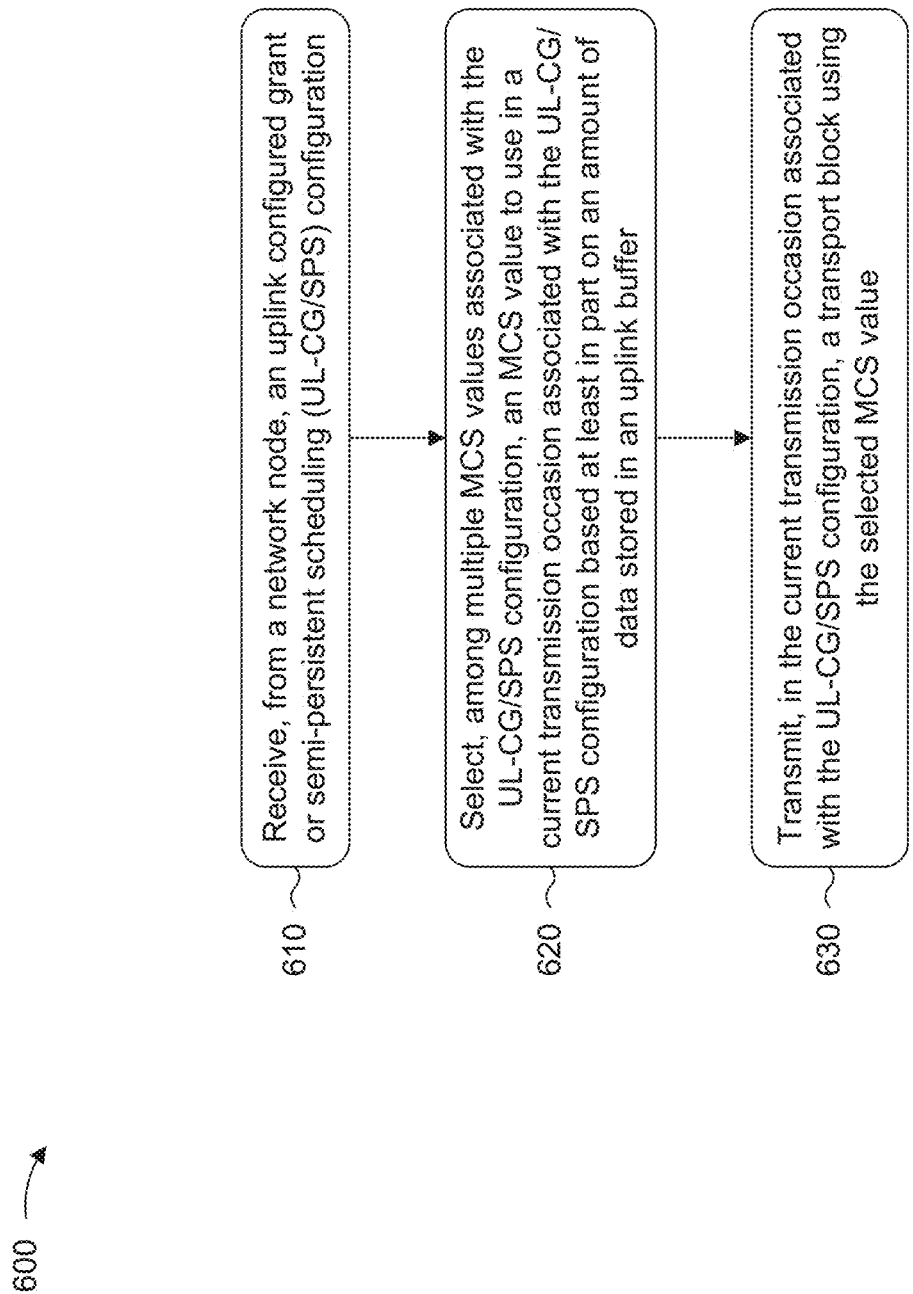
FIG. 6 is a diagram illustrating an example process associated with a UL-CG/SPS configuration with multiple MCS values to accommodate low uplink buffer data, in accordance with the present disclosure.

FIG. 6 is a diagram illustrating an example process 600 performed, for example, by a UE, in accordance with the present disclosure. Example process 600 is an example where the UE (e.g., UE 120) performs operations associated with a UL-CG/SPS configuration with multiple MCS values to accommodate low uplink buffer data.

As shown in FIG. 6, in some aspects, process 600 may include receiving, from a network node, a UL-CG/SPS configuration (block 610). For example, the UE (e.g., using communication manager 140 and/or reception component 702, depicted in FIG. 7) may receive, from a network node, a UL-CG/SPS configuration, as described above.

As further shown in FIG. 6, in some aspects, process 600 may include selecting, among multiple MCS values associated with the UL-CG/SPS configuration, an MCS value to use in a current transmission occasion associated with the UL-CG/SPS configuration based at least in part on an amount of data stored in an uplink buffer (block 620). For example, the UE (e.g., using communication manager 140 and/or MCS selection component 708, depicted in FIG. 7) may select, among multiple MCS values associated with the UL-CG/SPS configuration, an MCS value to use in a current transmission occasion associated with the UL-CG/SPS configuration based at least in part on an amount of data stored in an uplink buffer, as described above.

As further shown in FIG. 6, in some aspects, process 600 may include transmitting, in the current transmission occasion associated with the UL-CG/SPS configuration, a transport block using the selected MCS value (block 630). For example, the UE (e.g., using communication manager 140 and/or transmission component 704, depicted in FIG. 7) may transmit, in the current transmission occasion associated with the UL-CG/SPS configuration, a transport block using the selected MCS value, as described above.

Process 600 may include additional aspects, such as any single aspect or any combination of aspects described below and/or in connection with one or more other processes described elsewhere herein.

In a first aspect, the multiple MCS values are indicated in signaling that configures the UL-CG/SPS configuration.

In a second aspect, alone or in combination with the first aspect, process 600 includes receiving, from the network node, DCI activating the UL-CG/SPS configuration, wherein the multiple MCS values are indicated in the DCI activating the UL-CG/SPS configuration.

In a third aspect, alone or in combination with one or more of the first and second aspects, process 600 includes receiving, from the network node, DCI that activates the UL-CG/SPS configuration and indicates an MCS value, wherein signaling that configures the UL-CG/SPS configuration indicates one or more MCS offset values that are used to derive the multiple MCS values from the MCS value indicated in the DCI that activates the UL-CG/SPS configuration.

In a fourth aspect, alone or in combination with one or more of the first through third aspects, selecting the MCS value to use in the current transmission occasion includes selecting, among a first MCS value and a second MCS value that is lower than the first MCS value, the first MCS value based at least in part on the amount of data stored in the uplink buffer satisfying a threshold associated with the first MCS value.

In a fifth aspect, alone or in combination with one or more of the first through fourth aspects, selecting the MCS value to use in the current transmission occasion includes selecting, among a first MCS value and a second MCS value that is lower than the first MCS value, the second MCS value based at least in part on the amount of data stored in the uplink buffer failing to satisfy a first threshold associated with the first MCS value and satisfying a second threshold associated with the second MCS value.

In a sixth aspect, alone or in combination with one or more of the first through fifth aspects, process 600 includes skipping a subsequent transmission occasion associated with the UL-CG/SPS configuration based at least in part on determining that the amount of data stored in the uplink buffer fails to satisfy a threshold associated with a lowest MCS value included among the multiple MCS values.

In a seventh aspect, alone or in combination with one or more of the first through sixth aspects, a PUSCH message carrying the transport block includes a DMRS sequence associated with the selected MCS value.

In an eighth aspect, alone or in combination with one or more of the first through seventh aspects, process 600 includes transmitting, to the network node, UCI associated with the current transmission occasion, wherein the UCI indicates the selected MCS value used to transmit the transport block in the current transmission occasion.

In a ninth aspect, alone or in combination with one or more of the first through eighth aspects, process 600 includes transmitting, to the network node in a transmission occasion immediately prior to the current transmission occasion, information that indicates the selected MCS value to be used to transmit the transport block in the current transmission occasion.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
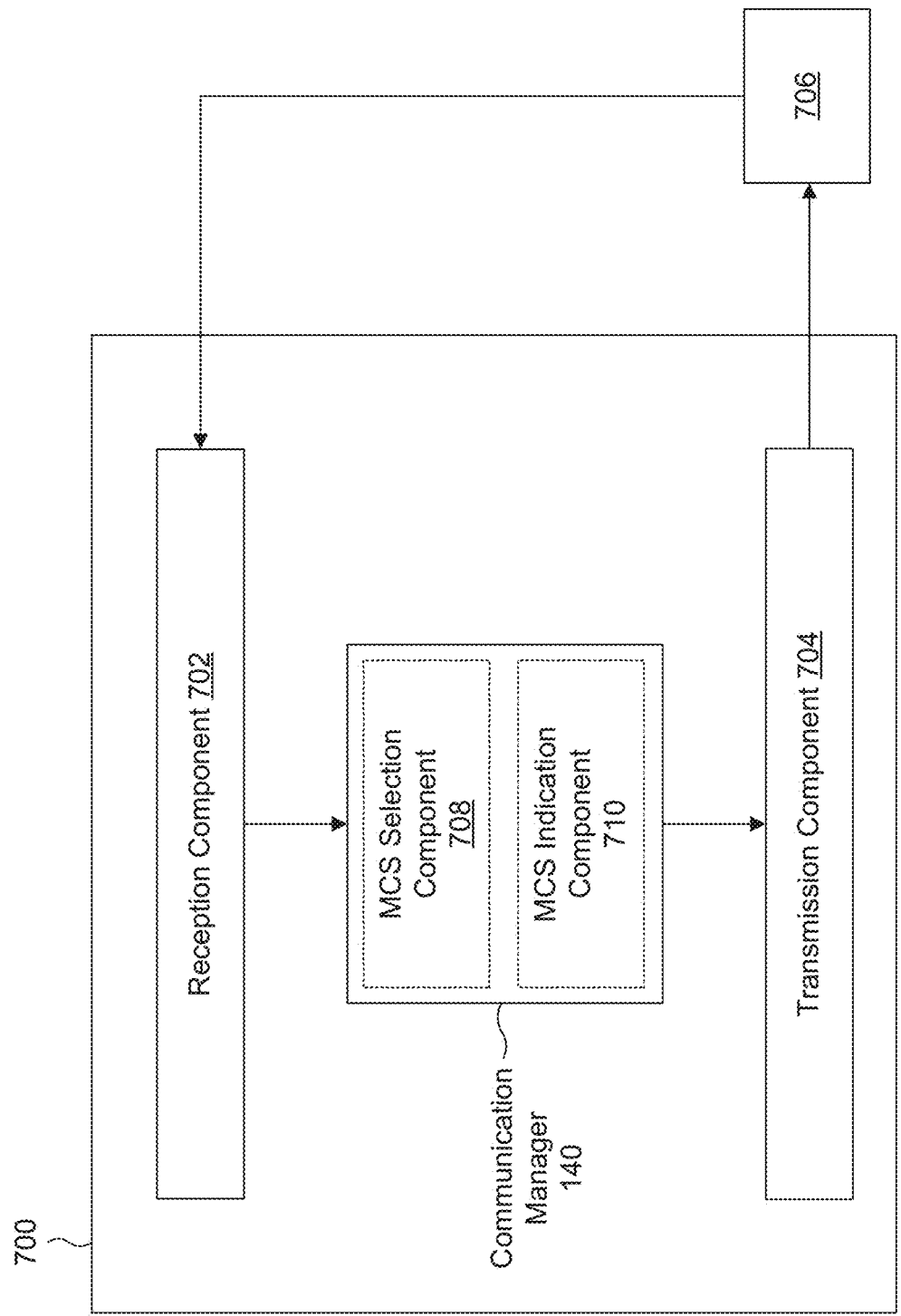
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an MCS selection component 708 or an MCS indication component 710, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, from a network node, a UL-CG/SPS configuration. The MCS selection component 708 may select, among multiple MCS values associated with the UL-CG/SPS configuration, an MCS value to use in a current transmission occasion associated with the UL-CG/SPS configuration based at least in part on an amount of data stored in an uplink buffer. The transmission component 704 may transmit, in the current transmission occasion associated with the UL-CG/SPS configuration, a transport block using the selected MCS value.

The reception component 702 may receive, from the network node, DCI activating the UL-CG/SPS configuration, wherein the multiple MCS values are indicated in the DCI activating the UL-CG/SPS configuration.

The reception component 702 may receive, from the network node, DCI that activates the UL-CG/SPS configuration and indicates an MCS value, wherein signaling that configures the UL-CG/SPS configuration indicates one or more MCS offset values that are used to derive the multiple MCS values from the MCS value indicated in the DCI that activates the UL-CG/SPS configuration.

The MCS selection component 708 may select, among a first MCS value and a second MCS value that is lower than the first MCS value, the first MCS value based at least in part on the amount of data stored in the uplink buffer satisfying a threshold associated with the first MCS value.

The MCS selection component 708 may select, among a first MCS value and a second MCS value that is lower than the first MCS value, the second MCS value based at least in part on the amount of data stored in the uplink buffer failing to satisfy a first threshold associated with the first MCS value and satisfying a second threshold associated with the second MCS value.

The MCS selection component 708 may skip a subsequent transmission occasion associated with the UL-CG/SPS configuration based at least in part on determining that the amount of data stored in the uplink buffer fails to satisfy a threshold associated with a lowest MCS value included among the multiple MCS values.

The MCS indication component 710 may configure a PUSCH message carrying the transport block to include a DMRS sequence associated with the selected MCS value to indicate the selected MCS value to the network node.

The transmission component 704 may transmit, to the network node, UCI associated with the current transmission occasion, wherein the MCS indication component 710 may configure the UCI to indicate the selected MCS value used to transmit the transport block in the current transmission occasion.

The MCS indication component 710 may cause the transmission component 704 to transmit, to the network node in a transmission occasion immediately prior to the current transmission occasion, information that indicates the selected MCS value to be used to transmit the transport block in the current transmission occasion.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: receiving, from a network node, a UL-CG/SPS configuration; selecting, among multiple MCS values associated with the UL-CG/SPS configuration, an MCS value to use in a current transmission occasion associated with the UL-CG/SPS configuration based at least in part on an amount of data stored in an uplink buffer; and transmitting, in the current transmission occasion associated with the UL-CG/SPS configuration, a transport block using the selected MCS value.

Aspect 2: The method of Aspect 1, wherein the multiple MCS values are indicated in signaling that configures the UL-CG/SPS configuration.

Aspect 3: The method of any of Aspects 1-2, further comprising: receiving, from the network node, DCI activating the UL-CG/SPS configuration, wherein the multiple MCS values are indicated in the DCI activating the UL-CG/SPS configuration.

Aspect 4: The method of any of Aspects 1-3, further comprising: receiving, from the network node, DCI that activates the UL-CG/SPS configuration and indicates an MCS value, wherein signaling that configures the UL-CG/SPS configuration indicates one or more MCS offset values that are used to derive the multiple MCS values from the MCS value indicated in the DCI that activates the UL-CG/SPS configuration.

Aspect 5: The method of any of Aspects 1-4, wherein selecting the MCS value to use in the current transmission occasion includes: selecting, among a first MCS value and a second MCS value that is lower than the first MCS value, the first MCS value based at least in part on the amount of data stored in the uplink buffer satisfying a threshold associated with the first MCS value.

Aspect 6: The method of any of Aspects 1-5, wherein selecting the MCS value to use in the current transmission occasion includes: selecting, among a first MCS value and a second MCS value that is lower than the first MCS value, the second MCS value based at least in part on the amount of data stored in the uplink buffer failing to satisfy a first threshold associated with the first MCS value and satisfying a second threshold associated with the second MCS value.

Aspect 7: The method of any of Aspects 1-4, further comprising: skipping a subsequent transmission occasion associated with the UL-CG/SPS configuration based at least in part on determining that the amount of data stored in the uplink buffer fails to satisfy a threshold associated with a lowest MCS value included among the multiple MCS values.

Aspect 8: The method of any of Aspects 1-7, wherein a PUSCH message carrying the transport block includes a DMRS sequence associated with the selected MCS value.

Aspect 9: The method of any of Aspects 1-8, further comprising: transmitting, to the network node, UCI associated with the current transmission occasion, wherein the UCI indicates the selected MCS value used to transmit the transport block in the current transmission occasion.

Aspect 10: The method of any of Aspects 1-9, further comprising: transmitting, to the network node in a transmission occasion immediately prior to the current transmission occasion, information that indicates the selected MCS value to be used to transmit the transport block in the current transmission occasion.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network node, an uplink configured grant or semi-persistent scheduling (UL-CG/SPS) configuration;
   selecting, among multiple modulation and coding scheme (MCS) values associated with the UL-CG/SPS configuration, an MCS value to use in a current transmission occasion associated with the UL-CG/SPS configuration based at least in part on an amount of data stored in an uplink buffer;
   transmitting, in the current transmission occasion associated with the UL-CG/SPS configuration, a transport block using the selected MCS value; and
   skipping a subsequent transmission occasion associated with the UL-CG/SPS configuration based at least in part on the amount of data stored in the uplink buffer failing to satisfy a threshold associated with a lowest MCS value included among the multiple MCS values.

2. The method of claim 1, wherein the multiple MCS values are indicated in signaling that configures the UL-CG/SPS configuration.

3. The method of claim 1, further comprising:
   receiving, from the network node, downlink control information (DCI) activating the UL-CG/SPS configuration, wherein the multiple MCS values are indicated in the DCI activating the UL-CG/SPS configuration.

4. The method of claim 1, further comprising:
   receiving, from the network node, downlink control information (DCI) that activates the UL-CG/SPS configuration and indicates an MCS value, wherein signaling that configures the UL-CG/SPS configuration indicates one or more MCS offset values that are used to derive the multiple MCS values from the MCS value indicated in the DCI that activates the UL-CG/SPS configuration.

5. The method of claim 1, wherein selecting the MCS value to use in the current transmission occasion includes:
   selecting, among a first MCS value and a second MCS value that is lower than the first MCS value, the first MCS value based at least in part on the amount of data stored in the uplink buffer satisfying a threshold associated with the first MCS value.

6. The method of claim 1, wherein selecting the MCS value to use in the current transmission occasion includes:
   selecting, among a first MCS value and a second MCS value that is lower than the first MCS value, the second MCS value based at least in part on the amount of data stored in the uplink buffer failing to satisfy a first threshold associated with the first MCS value and satisfying a second threshold associated with the second MCS value.

7. The method of claim 1, wherein a physical uplink shared channel (PUSCH) message carrying the transport block includes a demodulation reference signal (DMRS) sequence associated with the selected MCS value.

8. The method of claim 1, further comprising:
transmitting, to the network node, uplink control information (UCI) associated with the current transmission occasion, wherein the UCI indicates the selected MCS value used to transmit the transport block in the current transmission occasion.

9. The method of claim 1, further comprising:
transmitting, to the network node in a transmission occasion immediately prior to the current transmission occasion, information that indicates the selected MCS value to be used to transmit the transport block in the current transmission occasion.

10. A user equipment (UE) for wireless communication, comprising:
one or more memories; and
one or more processors, coupled to the one or more memories, configured to:
receive, from a network node, an uplink configured grant or semi-persistent scheduling (UL-CG/SPS) configuration;
select, among multiple modulation and coding scheme (MCS) values associated with the UL-CG/SPS configuration, an MCS value to use in a current transmission occasion associated with the UL-CG/SPS configuration based at least in part on an amount of data stored in an uplink buffer;
transmit, in the current transmission occasion associated with the UL-CG/SPS configuration, a transport block using the selected MCS value; and
skip a subsequent transmission occasion associated with the UL-CG/SPS configuration based at least in part on determining that the amount of data stored in the uplink buffer fails to satisfy a threshold associated with a lowest MCS value included among the multiple MCS values.

11. The UE of claim 10, wherein the multiple MCS values are indicated in signaling that configures the UL-CG/SPS configuration.

12. The UE of claim 10, wherein the one or more processors are further configured to:
receive, from the network node, downlink control information (DCI) activating the UL-CG/SPS configuration, wherein the multiple MCS values are indicated in the DCI activating the UL-CG/SPS configuration.

13. The UE of claim 10, wherein the one or more processors are further configured to:
receive, from the network node, downlink control information (DCI) that activates the UL-CG/SPS configuration and indicates an MCS value, wherein signaling that configures the UL-CG/SPS configuration indicates one or more MCS offset values that are used to derive the multiple MCS values from the MCS value indicated in the DCI that activates the UL-CG/SPS configuration.

14. The UE of claim 10, wherein the one or more processors, to select the MCS value to use in the current transmission occasion, are configured to:
select, among a first MCS value and a second MCS value that is lower than the first MCS value, the first MCS value based at least in part on the amount of data stored in the uplink buffer satisfying a threshold associated with the first MCS value.

15. The UE of claim 10, wherein the one or more processors, to select the MCS value to use in the current transmission occasion, are configured to:
select, among a first MCS value and a second MCS value that is lower than the first MCS value, the second MCS value based at least in part on the amount of data stored in the uplink buffer failing to satisfy a first threshold associated with the first MCS value and satisfying a second threshold associated with the second MCS value.

16. The UE of claim 10, wherein a physical uplink shared channel (PUSCH) message carrying the transport block includes a demodulation reference signal (DMRS) sequence associated with the selected MCS value.

17. The UE of claim 10, wherein the one or more processors are further configured to:
transmit, to the network node, uplink control information (UCI) associated with the current transmission occasion, wherein the UCI indicates the selected MCS value used to transmit the transport block in the current transmission occasion.

18. The UE of claim 10, wherein the one or more processors are further configured to:
transmit, to the network node in a transmission occasion immediately prior to the current transmission occasion, information that indicates the selected MCS value to be used to transmit the transport block in the current transmission occasion.

19. A non-transitory computer-readable medium storing a set of instructions for wireless communication, the set of instructions comprising:
one or more instructions that, when executed by one or more processors of a user equipment (UE), cause the UE to:
receive, from a network node, an uplink configured grant or semi-persistent scheduling (UL-CG/SPS) configuration;
select, among multiple modulation and coding scheme (MCS) values associated with the UL-CG/SPS configuration, an MCS value to use in a current transmission occasion associated with the UL-CG/SPS configuration based at least in part on an amount of data stored in an uplink buffer;
transmit, in the current transmission occasion associated with the UL-CG/SPS configuration, a transport block using the selected MCS value; and
skip a subsequent transmission occasion associated with the UL-CG/SPS configuration based at least in part on determining that the amount of data stored in the uplink buffer fails to satisfy a threshold associated with a lowest MCS value included among the multiple MCS values.

20. The non-transitory computer-readable medium of claim 19, wherein a physical uplink shared channel (PUSCH) message carrying the transport block includes a demodulation reference signal (DMRS) sequence associated with the selected MCS value.

21. The non-transitory computer-readable medium of claim 19, wherein the one or more instructions further cause the UE to:
transmit, to the network node, uplink control information (UCI) associated with the current transmission occasion, wherein the UCI indicates the selected MCS value used to transmit the transport block in the current transmission occasion.

22. The non-transitory computer-readable medium of claim 19, wherein the one or more instructions further cause the UE to:
transmit, to the network node in a transmission occasion immediately prior to the current transmission occasion, information that indicates the selected MCS value to be used to transmit the transport block in the current transmission occasion.

23. The non-transitory computer-readable medium of claim 19, wherein the one or more instructions further cause the UE to:

receive, from the network node, downlink control information (DCI) that activates the UL-CG/SPS configuration and indicates an MCS value, wherein signaling that configures the UL-CG/SPS configuration indicates one or more MCS offset values that are used to derive the multiple MCS values from the MCS value indicated in the DCI that activates the UL-CG/SPS configuration.

24. An apparatus for wireless communication, comprising:

means for receiving, from a network node, an uplink configured grant or semi-persistent scheduling (UL-CG/SPS) configuration;

means for selecting, among multiple modulation and coding scheme (MCS) values associated with the UL-CG/SPS configuration, an MCS value to use in a current transmission occasion associated with the UL-CG/SPS configuration based at least in part on an amount of data stored in an uplink buffer;

means for transmitting, in the current transmission occasion associated with the UL-CG/SPS configuration, a transport block using the selected MCS value; and means for skipping a subsequent transmission occasion associated with the UL-CG/SPS configuration based at least in part on the amount of data stored in the uplink buffer failing to satisfy a threshold associated with a lowest MCS value included among the multiple MCS values.

25. The apparatus of claim 24, wherein a physical uplink shared channel (PUSCH) message carrying the transport block includes a demodulation reference signal (DMRS) sequence associated with the selected MCS value.

26. The apparatus of claim 24, further comprising:

means for transmitting, to the network node, uplink control information (UCI) associated with the current transmission occasion, wherein the UCI indicates the selected MCS value used to transmit the transport block in the current transmission occasion.

27. The apparatus of claim 24, further comprising:

means for transmitting, to the network node in a transmission occasion immediately prior to the current transmission occasion, information that indicates the selected MCS value to be used to transmit the transport block in the current transmission occasion.

28. The apparatus of claim 24, further comprising:

means for receiving, from the network node, downlink control information (DCI) that activates the UL-CG/SPS configuration and indicates an MCS value, wherein signaling that configures the UL-CG/SPS configuration indicates one or more MCS offset values that are used to derive the multiple MCS values from the MCS value indicated in the DCI that activates the UL-CG/SPS configuration.

\* \* \* \* \*